United States Patent [19]

Rademachers et al.

[11] 4,036,662
[45] July 19, 1977

[54] METAL ADDITIONS TO PIGMENTS OF PSEUDOBROOKITE-TITANIUM DIOXIDE STRUCTURE

[75] Inventors: Jacob Rademachers; Henning Erfurth; Franz Hund, all of Krefeld, Germany

[73] Assignee: Bayer Aktiengesellschaft, Leverkusen, Germany

[21] Appl. No.: 624,214

[22] Filed: Oct. 20, 1975

[30] Foreign Application Priority Data

Oct. 26, 1974  Germany .............................. 2451042

[51] Int. Cl.² .......................... C09C 1/36; C09C 1/22; C01G 23/00; C01G 49/00
[52] U.S. Cl. .................................. 106/300; 106/304; 423/598; 423/594
[58] Field of Search ................ 106/304, 300; 423/598, 423/594

[56]         References Cited
              U.S. PATENT DOCUMENTS

| | | | |
|---|---|---|---|
| 2,084,826 | 6/1937 | Ryan et al. | 106/304 X |
| 2,940,941 | 6/1960 | Dalton | 106/300 X |
| 3,214,283 | 10/1965 | Chopoorian | 106/304 X |
| 3,874,890 | 4/1975 | Bernhard et al. | 106/304 X |
| Re. 21,427 | 4/1940 | McKinney et al. | 106/300 |

*Primary Examiner*—Winston A. Douglas
*Assistant Examiner*—William G. Wright
*Attorney, Agent, or Firm*—Burgess, Dinklage & Sprung

[57]           ABSTRACT

In the production of temperature-stable inorganic pigment of pseudobrookite-titanium dioxide structure having the composition $Fe_2TiO_5 \cdot x\ TiO_2$, wherein $x$ is from 0 to about 15, by preparing a suspension of finely divided titanium dioxide or titanium dioxide hydrate and at least one of finely divided iron oxide, iron oxide hydroxide, iron hydroxide and iron carbonate, removing the aqueous phase of the suspension from a solid residue and calcining the residue at a temperature in the range of about 600° to 1100° C, the improvement which comprises including in the suspension or in the solid residue at least one compound of a metal selected from the group consisting of lithium, sodium, potassium, magnesium, zinc, calcium, aluminum, copper, vanadium, chromium, manganese, cobalt and nickel, the compound being present in a quantity to provide about 0.1 to 10 % by weight of metal based on the pigment. With the addition of compounds of lithium, sodium, potassium, magnesium, zinc, calcium or aluminum even in small amounts a much purer yellow color results.

16 Claims, No Drawings

METAL ADDITIONS TO PIGMENTS OF PSEUDOBROOKITE-TITANIUM DIOXIDE STRUCTURE

The present invention relates to production of inorganic pigments of pseudobrookite-titanium dioxide structure.

According to Application Ser. No. 497,366 filed Aug. 14, 1974, now pending, temperature-stable inorganic yellow pigments with the general composition $Fe_2TiO_5 \cdot x\ TiO_2$, where $x$ can assume any value from 0 to 15, and with a particle diameter of less than 1 micron can be obtained by preparing a suspension of finely divided iron oxide and/or iron oxide hydroxide and/or iron hydroxide and/or iron carbonate with finely divided titanium dioxide and/or titanium dioxide hydrate, corresponding to the stoichiometric composition $Fe_2TiO_5 \cdot x\ TiO_2$, separating off the aqueous phase of the mixed suspension, and calcining the residues at temperatures in the range of from 600° C to 1100° C, optionally followed by grinding. The pigments thus prepared are thermostable, relatively inexpensive inorganic pigments with a yellow, yellow-brown to yellow-orange color and high coloring strength. They consist of $Fe_2TiO_5$ crystallizing in the pseudobrookite lattice or of mixtures of $Fe_2TiO_5$ crystallizing in the pseudobrookite lattice with $TiO_2$ of rutile or anatase structure. The excess $TiO_2$ in relation to pure $Fe_2TiO_5$ is probably present either chemically dissolved, with heterotype mixed-phase formation, in the $Fe_2TiO_5$ crystallizing in the pseudobrookite lattice, or in the form of $TiO_2$ crystallizing in the anatase or rutile lattice. These temperature-stable inorganic yellow to yellow-brown pigments with an optimum particle diameter of from 0.1 to 1 micron are obtained by effecting a complete reaction of the components to form the compound $Fe_2TiO_5$ or its solid solution with $TiO_2$ by suitably selecting reaction-active iron and titanium compounds and their relative quantitative ratios at a sufficiently low calcination temperature and, optionally, even by establishing a weakly reducing calcination atmosphere ($SO_2$, $CO$) in the first quarter of the calcination period. Suitable reaction-active iron compounds are iron(II)oxide, iron(II)hydroxide, iron(II)carbonate, iron(III)oxide hydroxide and amorphous iron(III)hydroxide or $Fe_3O_4$ in finely divided form. Iron(II)hydroxide or carbonate, iron oxide hydroxide or amorphous iron hydroxide may be obtained, for example, in known manner from iron(II)-salt solutions, preferably from iron sulfate solutions, by reaction with an alkali metal, ammonium or alkaline earth metal hydroxide or carbonate. $Fe_3O_4$ may advantageously be used in the form in which it accumulates after nitrobenzene reduction with iron in concentrated $FeCl_2$-solution, i.e. in the form of a finely dispersed black sludge (German Patent No. 463,773). The uncalcined, washed titanium dioxide aquate sludge accumulating during the hydrolysis of titanium(IV)salt on a commercial scale, preferably during the hydrolysis of titanium sulfate, has proved to be a particularly suitable, reaction-active finely divided titanium dioxide. The low sulfate content of the washed white sludge is particularly advantageous for adjusting the weakly reducing calcination atmosphere in the first quarter of the calcination period. Chloride hydrolysis sludge, and similarly an iron(II)-hydroxide or carbonate precipitated from iron(II) chloride solution, can be improved in regard to their suitability as starting materials by the absorption of sulfate ions or by the addition of elemental sulfur or carbon. Reducing agents, such as finely divided carbon or sulfur, may be used in quantities of from 0.1 to 10% by weight and preferably in quantities of from 0.2 to 5% by weight (based on the final pigment). Under the same calcination conditions, the particle diameters of the pigments obtained are finer, the more finely divided the starting materials used. There are two processes which are particularly suitable for the production of these pigments. In the first of these processes, a finely divided $Fe_3O_4$ black sludge and a $TiO_2$ white sludge are mixed, corresponding to the general formula $Fe_2TiO_5 \cdot x\ TiO_2$, the mixed suspension obtained is washed and/or concentrated by evaporation or spray-dried or filtered and dried or only filtered, and the filter cake or dry material is calcinated at a temperature above 600° C and preferably at a temperature in the range of from 750° to 1000° C, to form pigments of a suitable particle size and with the required composition.

In the second process, a $TiO_2$ suspension is mixed with an iron(II)salt solution and the mixture is adjusted with an alkali metal, ammonium or alkaline earth metal hydroxide or carbonate to pH-values in the range of from 5 to 12 and preferably in the range of from 7 to 10. The mixed deposits obtained may then be further treated in the same way as described in reference to the first process.

The pigments obtained corresponding to the stoichiometric composition $Fe_2TiO_5 \cdot x\ TiO_2$, where $x$ may have the meaning already defined, have a yellow color with a more or less distinct brown tinge according to the titanium dioxide content. Pigments of low titanium dioxide content ($x = 0$) are yellow-brown in color. Although the brown tinge becomes less noticeable as the titanium dioxide content increases, the pigments become lighter and more fawn in color with decreasing brownness. The best color results may be obtained with the composition $Fe_2TiO_5 \cdot 3\ TiO_2$ which corresponds to a yellow lightly tinged with brown.

The object of the present invention is to obtain an improvement in the color of a pseudobrookite-titanium dioxide pigments. According to the invention, this object can be achieved by additions of certain inorganic compounds.

Accordingly, the present invention relates to temperature-stable inorganic pigments based on pseudobrookite-titaniumm dioxide with the composition $Fe_2TiO_5 \cdot x\ TiO_2$, where $x$ may assume values from 0 to 15, preferably about 2 to 4, containing one or more of the elements lithium, sodium, potassium, magnesium. zinc, calcium, aluminum, copper, vanadium, chromium, manganese, cobalt and nickel in quantities of about 0.1 to 10% by weight and preferably in quantities of about 0.1 to 5% by weight, based on the pigment.

The invention also relates to a process for the production of temperature-stable inorganic pigments based on pseudobrookite-titanium dioxide with the composition $Fe_2TiO_5 \cdot x\ TiO_2$, where $x$ may assume values of from 0 to 15, preferably about 2 to 4, distinguished by the fact that a suspension of finely divided iron oxide and/or iron oxide hydroxide and/or iron hydroxide and/or iron carbonate and finely divided titanium dioxide and/or titanium dioxide hydrate is prepared, compounds of the metals lithium, sodium, potassium, magnesium, zinc, calcium, aluminum, copper, vanadium, chromium, manganese, cobalt, nickel or any mixtures thereof are added in quantities sufficient to provide about 0.1 to 10% by weight of metal, based on the pigment, before or after separation of the aqueous phase of the mixed suspension, and the residue freed from the aqueous phase is calcined at temperatures in the range of from about 600° to 1100°C and optionally ground.

By adding the metal compounds in accordance with the invention, it is possible to control the color of the pigment obtained in an advantageous manner. Thus, the addition of alkali metal, alkaline earth metal, zinc or alumium compounds produces a distinct displacement towards purer yellows, which has a particularly marked effect in the case of a compound with the approximate composition $Fe_2TiO_5 \cdot 3\ TiO_2$. Additions of metal compounds which have a color of their own and which are classified in the Fourth Period of the Periodic System of Element, namely copper, vanadium, chromium, manganese, cobalt and nickel, produce significant displacements in color towards different, intensive shades of brown. In this case, the ratio of pseudobrookite to titanium dioxide is less critical but the additives still have a marked tinctorial effect.

The degree of color displacement increases with the doping element content of the pigment. With an $Fe_2TiO_5:TiO_2$ molar ratio of 1:3 a doping element content in the pigment of about 0.1 to 2% by weight is generally sufficient to produce a distinct change in color in relation to an undoped comparison pigment.

The doping elements may be added to the iron- and titanium-containing starting mixtures in the form of sulfates, nitrates, acetates and carbonates. However, the process is by no means limited to these salts. It is also possible to use, for example, disulfates, peroxodisulfates, hydrogen sulfates, sulfites, hydrogen sulfites, disulfites, sulfides, chlorides, alkoxides, hydroxides, oxides or hydrogen carbonates. It is also possible to use the doping metals in elemental form, i.e. in the form of finely divided metal powders which are converted into the corresponding oxidic compounds during pigment formation.

In general, the metal compounds may be added in solid form, in suspension or in solution.

In a preferred embodiment, the pigments according to the invention are prepared in intially introducing an aqueous titanium dioxide hydrate suspension, preferably emanating from the production of titanium dioxide pigments, into an aqueous iron(II) sulfate solution in the required Fe:Ti ratio, precipitating the iron in the form of iron hydroxide with sodium hydroxide solution, washing out the sodium sulfate formed from the mixed suspension, suspending the washed sludge containing the doping agent in dissolved or dispersed form in water, optionally followed by filtration, and then drying, calcining and grinding the sludge mixture containing the doping agent.

Instead of precipitating iron by using iron sulfate solution and subsequently adding sodium hydroxide or even potassium hydroxide, ammonium hydroxide or corresponding carbonates, it is also possible to use an iron oxide, hydroxide or oxide hydroxide suspension emanating from the production of iron oxide pigments.

The doping agent may even be added to the already dried iron-containing and titanium-containing mixture. Another possibility is for the additive to be present, for example as an impurity, in the starting iron or titanium compound. Thus, the $FeSO_4 \cdot 7\ H_2O$ used as starting material for the precipitation of iron hydroxide may contain magnesium as an impurity, as can be the case with the $FeSO_4 \cdot 7\ H_2O$ obtained during the production of titanium dioxide pigment from ilmenite by the sulfate process. Accordingly, the magnesium is precipitated together with the iron in hydroxide form by the addition of sodium hydroxide in the presence of titanium dioxide hydrate. The sludge mixture is then washed, dried and calcined. This procedure is advantageous because the same quantity of doping agent is always supplied by the starting material, co-precipitated during the process and no longer removed during the washing stage.

In another embodiment of the process according to the invention, it is also possible to use, as a doping agent, the sodium sulfate formed during the production of a titanium dioxide hydrate/iron hydroxide mixed suspension from titanium dioxide hydrate sludge and aqueous iron(II)sulfate solution by precipitation with sodium hydroxide, and only to wash out the sodium sulfate during further processing of the mixed suspension, for example by repeated decantation of the supernatant solution, followed by the addition of water, to such an extent that the end product contains the quantity of sodium necessary for achieving the required color. In this way, the color of the pigment can be adjusted in dependence upon the degree of washing of the sludge mixture.

Finally, it is also possible to combine several of the variants of the process described above. The color may also be varied within limits depending on the calcination temperature and the calcination time, a change from yellows to yellow-browns occurring with increasing calcination temperatures and increasing calcination times in accordance with the growth of the pigment grain. The most favorable conditions for pigments of pure color and high coloring strength in the process according to the invention are obtained with a calcination time of about 1 hour at about 900° C.

The temperature-stable yellow or brown pigments obtained in accordance with the invention may be used for any application for which the usual inorganic pigments, such as calcium, strontium, barium, lead and zinc chromates, litharge (PbO), Naples yellow (lead antimonate), cadmium yellow and the rutile mixed phases of titanium dioxide with nickel, antimony or chromium-antimony oxides, are unsuitable either because of their high price or because of their lower temperature stability (stable at temperatures of only up to 200° C), as is the case with iron oxide yellow or brown. Organic pigments are both too expensive and also thermally and optically too unstable for the applications in question.

The pigments produced in accordance with the invention may be used, for example, for coloring organic plastics thermally processed at temperatures above 200° C, such as polyvinyl chloride, polyethylene, polystyrene, ABS-copolymers, etc., and for coloring inorganic glazes, enamel and ceramic articles or lime-sand bricks and also for coloring concrete pile granulates or other stoved coatings based on waterglass.

The invention is illustrated by the following Example:

EXAMPLE 1

95 kg of a titanium dioxide hydrate sludge emanating from the industrial hydrolysis of titanium sulfate, with a solids content of 25.4% corresponding to 24 kg of $TiO_2$, are neutralized with concentrated sodium hydroxide solution, followed by the addition with stirring of 93 liters of an iron(II)sulfate solution (24.85 g/l of $FeSO_4$), which corresponds to 12 kg of $Fe_2O_3$. The quantitative ratios correspond to the composition $Fe_2TiO_5 \cdot 3\ TiO_2$. The iron is then precipitated with 74 liters of a sodium hydroxide solution containing 180 g of NaOH per liter. The mixed suspension is then stirred for another hour and subsequently washed with water until it shows a neutral reaction and is free from sulfate. The washed suspension has a solids content of 11.4%.

A certain quantity of a doping salt (cf. Table 1) is then added to batches of 440 g of the suspension washed free from sulfate.

The mixture is then stirred for 15 minutes, filtered under suction without being washed and dried at 110° C. The dry material is placed in a crucible and introduced into a muffle furnace preheated to 900° C, removed from the furnace after 1 hour at 900° C and ground. A lacquer is prepared from the calcined and ground pigment and the doping metal content is determined. As can be seen from the summary of test results in Table 1, doping with magnesium, calcium and aluminum produces a distinct displacement of the color in the lacquer to yellow, which increases with the content of doping metal, in relation to an undoped comparison pigment. It is remarkable that doping metal contents in the pigment of as little as about 0.5 to 2% by weight are able to displace the color of the pigment towards a purer yellow. Nickel salts produce displacements towards intensive browns with increasing doping level.

EXAMPLE 2

A titanium dioxide hydrate/iron hydroxide mixed suspension corresponding to the composition $Fe_2TiO_5 \cdot 3 TiO_2$ is prepared in the same way as in Example 1 from titanium dioxide hydrate sludge, iron(II)sulfate solution and sodium hydroxide. The mixed suspension has a solids content of 10% and is doped and further processed in the manner described above.

Table 2 shows that improvements in color can be obtained by doping with various sodium salts, lithium nitrate and aluminum sulfate in the same way as in the first series of tests.

Table 1

| Test No. | Addition per 440 g of sulfate-free suspension with a solids content of 11.4% | Color of pigment in lacquer | % Additive metal based on pigment weight |
|---|---|---|---|
| Comparison test | — | brownish yellow | |
| 1 | 2.2 g MgSO4 | somewhat yellower than comparison sample | 0.30 % Mg |
| 2 | 4.4 g MgSO4 | distinctly yellower than comparison sample | 0.47 % Mg |
| 3 | 8.8 g MgSO4 | much yellower than comparison sample | 0.73 % Mg |
| 4 | 2.7 g Mg(NO3)2 | somewhat yellower than comparison sample | 0.25 % Mg |
| 5 | 5.4 g Mg(NO3)2 | distinctly yellower than comparison sample | 0.40 % Mg |
| 6 | 10.8 g Mg(NO3)2 | distinctly yellower than comparison sample | 0.58 % Mg |
| 7 | 3.0 g Ca(NO3)2 | more orangey-yellow than comparison sample | 0.66 % Ca |
| 8 | 6.0 g Ca(NO3)2 | distinctly more orangey-yellow than comparison sample | 0.92 % Ca |
| 9 | 12.0 g Ca(NO3)2 | distinctly more orangey-yellow than comparison sample | 1.3 % Ca |
| 10 | 2.8 g NiSO4 | orangey-yellow | 1.1 % Ni |
| 11 | 5.6 g NiSO4 | red-brown | 2.2 % Ni |
| 12 | 11.2 g NiSO4 | brown | 3.8 % Ni |
| 13 | 3.3 g Ni(NO3)2 | orangey-yellow | 1.1 % Ni |
| 14 | 6.6 g Ni(NO3)2 | red-brown | 1.9 % Ni |
| 15 | 13.2 g Ni(NO3)2 | brown | 3.2 % Ni |
| 16 | 2.1 g Ni(CH3COO)2 | orangey-yellow | 0.8 % Ni |
| 17 | 4.2 g Ni(CH3COO)2 | reddish-brown | 1.6 % Ni |
| 18 | 8.4 g Ni(CH3COO)2 | dark red-brown | 3.0 % Ni |
| 19 | 4.0 g Al(NO3)3 | slightly yellower than comparison sample | 0.6 % Al |
| 20 | 8.0 g Al(NO3)3 | distinctly yellower than comparison sample | 1.1 % Al |
| 21 | 16.0 g Al(NO3)3 | much yellower than comparison sample | 2.0 % Al |
| 22 | 8.8 g ZnSO4 | distinctly yellower and purer than comparison sample | 1.0 % Zn |

Table 2

| Test No. | Addition per 500 g of sulfate-free suspension with a solids content of 10 % | Color of pigment in lacquer | % Additive metal based on pigment weight |
|---|---|---|---|
| Comparison test | | brownish yellow | |
| 1 | 1.5 g Na2Al4 | yellower than comparison sample | 0.39 % Na |
| 2 | 3.0 g Na2SO4 | distinctly yellower than comparison sample | 0.59 % Na |
| 3 | 6.0 g Na2SO4 | much yellower than comparison sample | 0.99 % Na |
| 4 | 0.95 g Na2CO3 | slightly yellower than comparison sample | 0.19 % Na |
| 5 | 1.9 g Na2CO3 | slightly yellower than comparison sample | 0.18 % Na |
| 6 | 3.8 g Na2CO3 | much yellower than comparison sample | 0.28 % Na |
| 7 | 1.5 g NaNO3 | slightly yellower than comparison sample | 0.32 % Na |
| 8 | 3.0 g NaNO3 | much yellower than comparison sample | 0.38 % Na |
| 9 | 6.0 g NaNO3 | very much yellower than comparison sample | 0.42 % Na |
| 10 | 2.0 g LiNO3 | slightly yellower than comparison sample | 0.10 % Li |
| 11 | 4.0 g LiNO3 | distinctly yellower than comparison sample | 0.17 % Li |
| 12 | 8.0 g LiNO3 | distinctly yellower than comparison sample | 0.27 % Li |
| 13 | 3.1 g Al2(SO4)3 | slightly yellower than comparison sample | 0.66 % Al |
| 14 | 6.2 g Al2(SO4)3 | slightly yellower than comparison sample | 1.3 % Al |
| 15 | 12.4 g Al2(SO4)3 | distinctly yellower than comparison sample | 1.7 % Al |

EXAMPLE 3

A suspension of 126.48 g of titanium dioxide hydrate having a solids content of 25.3% (corresponding to 32 g of $TiO_2$) and 121.76 ml of an $FeSO_4$-solution containing 250 g/l of $FeSO_4$ (corresponding to 16 g of $Fe_2O_3$) is initially introduced and the iron is precipitated while stirring with 110.0 ml of sodium hydroxide (160 g of NaOH/l). After the mixture has been left to settle, the supernatant solution is decanted off, distilled water is added, and the mixture is stirred, left to settle again and decanted. This is repeated until the suspension shows a neutral reaction and is free from sulfate. The washed suspension is finally filtered off, dried in a drying cabinet at 110° C and powdered. 6 g of the powder are calcined in a crucible. The product is introduced into a furnace heated to 900° C, removed after 1 hour and ground in a mortar.

Further tests are carried out in the same way, except that the salts quoted in Table 3 are added as doping agent to the titanium dioxide hydrate/FeSO$_4$-suspension before the sodium hydroxide is added. The quantity of sodium hydroxide added is increased from 110 to 125 ml in order to guarantee the co-precipitation of the cations added. The doping levels are such that 0.1, 0.2 and 0.3 gram atoms of the added metal per formula unit of Fe$_2$TiO$_5$ · 3 TiO$_2$ are precipitated /by the sodium hydroxide.

As already indicated in Example 1, magnesium also produces a displacement to yellow in this case by comparison with the undoped comparison sample. All the other doping agents give the pigment a more or less intensive brown color.

suffice. The sodium sulfate formed during precipitation of the iron from aqueous FeSO$_4$-solution with sodium hydroxide may also be used as the doping agent, and gradations in the color of the composition pigment are obtained according to the degree of washing of the titanium dioxide hydrate/iron hydroxide mixed suspension. This is illustrated by the following procedure:

9.5 kg of titanium dioxide hydrate sludge having a solids content of 25.3%, corresponding to 2.4 kg of TiO$_2$, are adjusted while stirring to a pH-value of 7 – 7.5 with approximately 50% sodium hydroxide solution, followed by the addition with thorough stirring of 8.97 liters of aqueous FeSO$_4$-solution (256.5 g of FeSO$_4$/l), corresponding to 1.2 kg of Fe$_2$O$_3$ · 8.2 liters of sodium hydroxide (162 g of NaOH per liter) and added with intensive stirring. After the iron has been precipitated, stirring is continued for 1 hour. The mixed suspension is made up to 90 liters with water, followed by stirring for 5 minutes. After settling, the supernatant clear solution is siphoned off and the suspension is made up with water again. This is repeated until the suspension shows a neutral reaction and is free from sulfate. After each wash, a small sample of the mixed suspension is taken, filtered, dried, calcined at 900° C, rubbed and a lacquer prepared. 12 washes are required to obtain neutrally and freedom from sulfate. The washing data are summarized in Table 4.

As the degree of washing increases, the color of the pigment changes from yellow through yellow orange to an intensive brown yellow. The coloring strength increases with the degree of washing.

Table 3

| Test No. | Doping metal | used in the form of | Addition in gram atoms of Me per formula unit Fe$_2$TiO$_5$ · 3 TiO2 | Color of pigment in lacquer coating |
| --- | --- | --- | --- | --- |
| Comparison test | — | — | — | brownish yellow |
| 1 | copper | CuSO$_4$ · 5 H$_2$O | 0.1 | somewhat browner than comparison sample |
| 2 | copper | CuSO$_4$ · 5 H$_2$O | 0.2 | distinctly browner than comparison sample |
| 3 | copper | CuSO$_4$ · 5 H$_2$O | 0.3 | much browner than comparison sample |
| 4 | nickel | NiSO$_4$ · 7 H$_2$O | 0.1 | somewhat browner than comparison sample |
| 5 | nickel | NiSO$_4$ · 7 H$_2$O | 0.2 | brown |
| 6 | nickel | NiSO$_4$ · 7 H$_2$O | 0.3 | strong brown |
| 7 | manganese | MnSO$_4$ · H$_2$O | 0.1 | brown |
| 8 | manganese | MnSO$_4$ · H$_2$O | 0.2 | dark brown |
| 9 | manganese | MnSO$_4$ · H$_2$O | 0.3 | black-brown |
| 10 | magnesium | MgSO$_4$ · 7 H$_2$O | 0.1 | somewhat yellower than comparison sample |
| 11 | magnesium | MgSO$_4$ · 7 H$_2$O | 0.2 | distinctly yellower than comparison sample |
| 12 | magnesium | MgSO$_4$ · 7 H$_2$O | 0.3 | much yellower than comparison sample |
| 13 | cobalt | CoSO$_4$ · 7 H$_2$O | 0.1 | beige-brown |
| 14 | cobalt | CoSO$_4$ · 7 H$_2$O | 0.2 | brown |
| 15 | cobalt | CoSO$_4$ · 7 H$_2$O | 0.3 | dark brown |
| 16 | vanadium | VOSO$_4$ · 5 H$_2$O | 0.1 | orange-brown |
| 17 | vanadium | VOSO$_4$ · 5 H$_2$O | 0.2 | red-brown |
| 18 | vanadium | VOSO$_4$ · 5 H$_2$O | 0.3 | dark red-brown |
| 19 | chromium | Cr$_2$(SO$_4$)$_3$ · H$_2$O | 0.1 | light brown |
| 20 | chromium | Cr$_2$(SO$_4$)$_3$ · H$_2$O | 0.2 | brown |
| 21 | chromium | Cr$_2$(SO$_4$)$_3$ · H$_2$O | 0.3 | dark brown |

EXAMPLE 4

This Example is intended to demonstrate that there is no need to introduce a special additive if it is desired to change the color of the pigment from brownish-yellow to yellow; modification of the conventional process will Table 4

| Wash No. | Settling time (minutes) | H$_2$O-siphoned off (l) | make-up water (l) | pH | Sulfate quantitative | Color of pigment |
| --- | --- | --- | --- | --- | --- | --- |
| 1 | 120 | 50 | 50 | 10.5 | very considerable | yellow |
| 2 | 120 | 50 | 50 | 9.5 | very considerable | |
| 3 | 100 | 50 | 50 | 9.0 | considerable | |
| 4 | 55 | 45 | 45 | 9.0 | considerable | |

Table 4-continued

| Wash No. | Settling time (minutes) | H$_2$O-siphoned off (l) | make-up water (l) | pH | Sulfate quantitative | Color of pigment |
|---|---|---|---|---|---|---|
| 5 | 50 | 55 | 55 | 9.0 | negligible | |
| 6 | 45 | 52 | 52 | 8.5 | negligible | |
| 7 | 70 | 57 | 57 | 8.5 | negligible | |
| 8 | 45 | 52 | 52 | 8.5 | negligible | |
| 9 | 50 | 57 | 57 | 8.5 | negligible | |
| 10 | 50 | 55 | 55 | 8.0 | negligible | |
| 11 | 50 | 55 | 55 | 7.0 | negligible | |
| 12 | 55 | 55 | 55 | 7.0 | none | brown-yellow |

It will be appreciated that the instant specification and claims are set forth by way of illustration and not limitation, and that various modifications and changes may be made without departing from the spirit and scope of the present invention.

What is claimed is:

1. A temperature-stable inorganic pigment of pseudobrookite-titanium dioxide structure having the composition Fe$_2$TiO$_5 \cdot x$ TiO$_2$, wherein $x$ is from 0 to about 15, and containing about 0.1 to 10% by weight of the pigment of at least one metal selected from the group consisting of lithium, sodium, potassium, magnesium, zinc, calcium, aluminum, copper, vanadium, chromium, manganese, cobalt and nickel.

2. A pigment according to claim 1, wherein $x$ is about 2 to 4 and said metal is present in about 0.1 to 5% by weight of the pigment.

3. A pigment according to claim 1, wherein $x$ is about 3, said metal is lithium, sodium, potassium, magnesium, zinc, calcium or aluminum and it is present in about 0.1 to 2% by weight of the pigment.

4. In the production of a temperature-stable inorganic pigment according to claim 1 of pseudobrookite-titanium dioxide structure having the composition Fe$_2$TiO$_5 \cdot x$ TiO$_2$, wherein $x$ is from 0 to about 15 by preparing a suspension of finely divided titanium dixoide or titanium dioxide hydrate and at least one of finely divided iron oxide, iron oxide hydroxide, iron hydroxide and iron carbonate, removing the aqueous phase of the suspension from a solid residue and calcining the residue at a temperature in the range of about 600° to 1100° C, the improvement which comprises including in the suspension at least one compound of a metal selected from the group consisting of lithium, sodium, potassium, magnesium, zinc, calcium, aluminum, copper, vanadium, chromium, manganese, cobalt and nickel, the compound being present in a quantity to provide about 0.1 to 10% by weight of metal based on the pigment.

5. A process according to claim 4, wherein the metal compound present in the suspension is at least one salt, oxide or hydroxide.

6. A process according to claim 4, wherein $x$ is about 2 to 4 and said metal compound is present in amount sufficient to provide about 0.1 to 5% of said metal by weight of the pigment.

7. A process according to claim 4, wherein $x$ is about 3, said metal is lithium, sodium, potassium, magnesium, zinc, calcium or aluminum, and said metal compound is present in amount sufficient to provide about 0.1 to 2% by weight of the pigment.

8. In the production of a temperature-stable inorganic pigment according to claim 1 and of pseudobrookite-titanium dioxide structure having the composition Fe$_2$TiO$_5 : x$ TiO$_2$, wherein $x$ is from 0 to about 15 by preparing a suspension of finely divided titanium dioxide or titanium dioxide hydrate and at least one of finely divided iron oxide, iron oxide hydroxide, iron hydroxide and iron carbonate, removing the aqueous phase of the suspension from a solid residue and calcining the residue at a temperature in the range of about 600° to 1100° C, the improvement which comprises including in the solid residue at least one compound of a metal selected from the group consisting of lithium, sodium, potassium, magnesium, zinc, calcium, aluminum, copper, vanadium, chromium, manganese, cobalt and nickel, the compound being present in a quantity to provide about 0.1 to 10% by weight of metal based on the pigment.

9. A process according to claim 8, wherein the metal compound present in the solid residue is at least one salt, oxide or hydroxide.

10. A process according to claim 8, wherein $x$ is about 2 to 4 and said metal compound is present in amount sufficient to provide about 0.1 to 5% of said metal by weight of the pigment.

11. A process according to claim 8, wherein $x$ is about 3, said metal is lithium, sodium, potassium, magnesium, zinc, calcium or aluminum, and said metal compound is present in amount sufficient to provide about 0.1 to 2% by weight of the pigment.

12. The pigment of claim 1 present as the coloring agent in a glaze.

13. The pigment of claim 1 present as the coloring agent in a ceramic.

14. The pigment of claim 1 present as the coloring agent in an enamel.

15. The pigment of claim 1 present as the coloring agent in a lime-sand-brick.

16. The pigment of claim 1 present as the coloring agent in a water-glass-based stoving coating.

* * * * *